(12) United States Patent
Xia et al.

(10) Patent No.: US 11,277,222 B2
(45) Date of Patent: *Mar. 15, 2022

(54) DATA TRANSMISSION METHOD AND COMMUNICATIONS DEVICE

(71) Applicant: HUAWEI TECHNOLOGIES CO., LTD., Guangdong (CN)

(72) Inventors: Xin Xia, Chengdu (CN); Yun Liu, Chengdu (CN); Weimin Chen, Chengdu (CN); Xiaoyu Luo, Chengdu (CN)

(73) Assignee: Huawei Technologies Co., Ltd., Guangdong (CN)

( * ) Notice: Subject to any disclaimer, the term of this patent is extended or adjusted under 35 U.S.C. 154(b) by 87 days.

This patent is subject to a terminal disclaimer.

(21) Appl. No.: 16/696,559

(22) Filed: Nov. 26, 2019

(65) Prior Publication Data

US 2020/0099468 A1 Mar. 26, 2020

Related U.S. Application Data

(63) Continuation of application No. PCT/CN2018/078966, filed on Mar. 14, 2018.

(30) Foreign Application Priority Data

May 31, 2017 (CN) .......................... 201710402011.6

(51) Int. Cl.
*H04W 72/04* (2009.01)
*H04L 1/00* (2006.01)
*H04L 5/00* (2006.01)

(52) U.S. Cl.
CPC .......... *H04L 1/0025* (2013.01); *H04L 5/0007* (2013.01); *H04L 5/0053* (2013.01); *H04W 72/042* (2013.01); *H04W 72/0453* (2013.01)

(58) Field of Classification Search
CPC . H04L 1/00; H04L 5/00; H04L 1/0025; H04L 5/0007; H04L 5/0053; H04W 72/042; H04W 72/0453
See application file for complete search history.

(56) References Cited

U.S. PATENT DOCUMENTS

| 2009/0245225 A1 | 10/2009 | Tseng |
| 2011/0170498 A1 | 7/2011 | Liu et al. |

(Continued)

FOREIGN PATENT DOCUMENTS

| CN | 103841643 A | 6/2014 |
| CN | 103929266 A | 7/2014 |

(Continued)

OTHER PUBLICATIONS

Chaitanya et al., "Progressive Hybrid Precoder Design for Packet Retransmissions in Large-Scale MIMO Systems," 2015 IEEE 26th International Symposium on Personal, Indoor and Mobile Radio Communications (PIMRC): Fundamentals and PHY, Aug. 2015, pp. 595-599.

(Continued)

*Primary Examiner* — Chi Ho A Lee
(74) *Attorney, Agent, or Firm* — Fish & Richardson P.C.

(57) ABSTRACT

Embodiments of the present disclosure disclose a data transmission method and a communications device. The method in the embodiments of the present disclosure includes: obtaining, by a first communications device, a transmission mode instruction, where the transmission mode instruction is used to instruct to use a frequency-domain repetition mode to transmit data, and the frequency-domain repetition mode means that same data is repeatedly transmitted on different frequency-domain resources; determining, by the first communications device, the frequency-domain repetition mode based on the transmission mode instruction; and performing, by the first communications (Continued)

device, data transmission with a second communications device in the frequency-domain repetition mode.

14 Claims, 8 Drawing Sheets

(56) References Cited

U.S. PATENT DOCUMENTS

| | | | |
|---|---|---|---|
| 2015/0078300 A1 | 3/2015 | Xu et al. | |
| 2015/0195115 A1* | 7/2015 | Yu | H04L 27/2617 375/295 |
| 2016/0081065 A1 | 3/2016 | Shi et al. | |
| 2016/0095127 A1 | 3/2016 | Roh et al. | |
| 2016/0323778 A1* | 11/2016 | Vermani | H04L 5/0053 |
| 2016/0338110 A1 | 11/2016 | Wang et al. | |
| 2017/0181194 A1 | 6/2017 | Huang et al. | |
| 2017/0264399 A1 | 9/2017 | Li et al. | |
| 2017/0265174 A1* | 9/2017 | Wang | H04W 72/042 |
| 2017/0359791 A1* | 12/2017 | Onggosanusi | H04L 5/0023 |
| 2018/0115925 A1 | 4/2018 | Moroga et al. | |
| 2019/0215864 A1* | 7/2019 | Yang | H04W 74/02 |
| 2019/0288811 A1* | 9/2019 | Chang | H04L 1/0041 |
| 2019/0372719 A1* | 12/2019 | Talarico | H04W 72/042 |
| 2020/0022149 A1* | 1/2020 | Beale | H04W 72/042 |
| 2020/0106559 A1* | 4/2020 | Vilaipornsawai | H04B 7/0408 |
| 2020/0145069 A1* | 5/2020 | Ferrante | H04B 7/10 |

FOREIGN PATENT DOCUMENTS

| | | |
|---|---|---|
| CN | 104639300 A | 5/2015 |
| CN | 105557039 A | 5/2016 |
| CN | 105917598 A | 8/2016 |
| CN | 107359966 A | 11/2017 |
| EP | 2497215 A2 | 9/2012 |
| WO | 2011129628 A2 | 10/2011 |
| WO | 2016033989 A1 | 3/2016 |
| WO | 2016163505 A1 | 10/2016 |
| WO | 2017078603 A1 | 5/2017 |

OTHER PUBLICATIONS

Office Action issued in Chinese Application No. 201710402011.6 dated Jun. 27, 2019, 14 pages (with English translation).

PCT International Search Report and Written Opinion issued in International Application No. PCT/CN2018/078966 dated May 29, 2018, 17 pages (with English translation).

R2-153721—Ericsson, "HARQ and TTI bundling for Rel-13 low complexity and coverage enhanced UEs," 3GPP TSG-RAN WG2 #91, Beijing, P.R. China, Aug. 24-28, 2015, 14 pages.

Sun et al., "Progressive Linear Precoder Optimization for MIMO Packet Retransmissions," IEEE Journal on Selected Areas in Communications, vol. 24, No. 3, Mar. 2006, pp. 448-456.

Extended European Search Report issued in European Application No. 18809858.6 dated Mar. 24, 2020, 9 pages.

Huawei, HiSilicon, "Data transmission for DL URLLC," 3GPP TSG RAN WG1 Meeting #89, R1-1706917, Hangzhou, China, May 15-19, 2017, 4 pages.

Office Action issued in Chinese Application No. 201710402011.6 dated Apr. 1, 2020, 14 pages (With English Translation).

* cited by examiner

DATA TRANSMISSION METHOD AND COMMUNICATIONS DEVICE

CROSS-REFERENCE TO RELATED APPLICATIONS

This application is a continuation of International Application No. PCT/CN2018/078966, filed on Mar. 14, 2018, which claims priority to Chinese Patent Application No. 201710402011.6, filed on May 31, 2017. The disclosures of the aforementioned applications are hereby incorporated by reference in their entireties.

TECHNICAL FIELD

The present invention relates to the communications field, and in particular, to a data transmission method and a communications device.

BACKGROUND

With an increase of wireless communication data traffic, a conventional sub-6 GHz spectrum is gradually not enough for use. Therefore, in a 5th generation new radio (5G NR for short) communications system, a higher frequency band, such as 15 GHz, 28 GHz, 38 GHz, 60 GHz, or 70 GHz, is used. A high frequency signal has a low distortion rate, and has advantages such as relatively strong recoverability and a strong anti-interference capability. However, the high frequency signal is different from a low frequency signal, and a path loss of the high frequency signal is very large, resulting in a limitation on a coverage distance.

To enhance coverage of the high frequency signal and reduce a (Signal Noise Ratio) SNR required for correct demodulation, a transmission time interval bundling (TTI Bundling for short) technology is proposed for a physical uplink shared channel (PUSCH for short) in a long term evolution (LTE for short) system. A basic unit of physical layer scheduling in LTE is 1 ms. However, in some cell edges, when coverage is limited, user equipment probably cannot satisfy a block error rate (BLER) requirement of data sending within a time interval of 1 ms due to a limitation on a transmit power of the user equipment. Therefore, a data packet is repeatedly transmitted on a plurality of consecutive transmission time interval (TTI) resources through TTI bundling, and a receive end combines data on the plurality of TTI resources to improve transmission quality, so as to overcome an edge coverage limitation.

However, in the TTI bundling, because data needs to be repeatedly transmitted in a plurality of subframes, a time for correct demodulation is prolonged, resulting in an increased latency, and poor applicability. For example, this is not applicable to many scenarios (such as self driving) having a high requirement on real-time quality, and a low latency requirement in 5G NR is not satisfied.

SUMMARY

Embodiments of the present invention provide a data transmission method and a communications device, to enhance coverage, and in particular, to enhance coverage of a high frequency signal. The data transmission method is applied to a communications device. In an implementation, the communications device is a base station. In another implementation, the communications device may be alternatively user equipment.

According to a first aspect, an embodiment of the present disclosure provides a data transmission method, including: obtaining, by a first communications device, a transmission mode instruction, where the transmission mode instruction is used to instruct to use a frequency-domain repetition mode to transmit data, the first communications device may be a base station or user equipment, and the frequency-domain repetition mode means that same data is repeatedly transmitted on different frequency-domain resources; determining, by the first communications device, the frequency-domain repetition mode based on the transmission mode instruction; and performing, by the first communications device, data transmission with a second communications device in the frequency-domain repetition mode. In this embodiment of the present disclosure, a same transport block is repeatedly transmitted in frequency domain, to improve demodulation performance and enhance signal coverage.

In a possible implementation, the performing, by the first communications device, data transmission with a second communications device in the frequency-domain repetition mode may include: sending, by the first communications device, data to the second communications device in the frequency-domain repetition mode, or receiving, by the first communications device, data sent by the second communications device in the frequency-domain repetition mode. In this embodiment of the present disclosure, the data generation method may be applied to sending of uplink data, and for example, the uplink data is data sent by user equipment to a base station. The data transmission method may also be applied to sending of downlink data, and the downlink data is data sent by a base station to user equipment.

In a possible implementation, a specific implementation in which the first communications device obtains the transmission mode instruction may be: receiving the transmission mode instruction sent by the second communications device. For example, the second communications device determines that the first communications device should be instructed to use the frequency-domain repetition mode to transmit data. Then, the second communications device generates the transmission mode instruction, the second communications device sends the transmission mode instruction to the first communications device, and the first communications device obtains the transmission mode instruction.

In a possible implementation, a specific manner in which the first communications device obtains the transmission mode instruction is: generating, by the first communications device, the transmission mode instruction. The first communications device first determines whether to use the frequency-domain repetition mode to send data, and generate the transmission mode instruction when the first communications device determines to use the frequency-domain repetition mode to send the data. In this embodiment of the present disclosure, the second communications device may instruct the first communications device to use the frequency-domain repetition mode to send the data, or the first communications device may autonomously determine to use the frequency-domain repetition mode to send the data. This increases an applicable scenario of the solution. The communications device sends the data in the frequency-domain repetition mode, so that demodulation performance of a channel can be improved, thereby increasing a coverage distance of a system.

In a possible implementation, after the first communications device generates the transmission mode instruction, the first communications device sends the transmission mode instruction to the second communications device, and the transmission mode instruction is used to instruct to use the frequency-domain repetition mode to transmit data. Specifically: 1. The first communications device sends the transmission mode instruction to the second communications device, and the transmission mode instruction indicates that the first communications device is to use the frequency-domain repetition mode to send data to the second communications device, to instruct the second communications device to use a corresponding manner to receive the data. 2. The transmission mode instruction is used to instruct the second communications device to use the frequency-domain repetition mode to send data to the first communications device. The first communications device may dynamically send the transmission mode instruction to the second communications device. To be specific, when detecting that current channel quality is relatively poor, the first communications device may instruct the second communications device to use the frequency-domain repetition mode to send the data. This enhances real-time quality. Alternatively, the first communications device may send the transmission mode instruction through semi-static signaling. To be specific, after sending the transmission mode instruction to the second communications device, the first communications device configures the second communications device. The first communications device may periodically instruct the second communications device to use the frequency-domain repetition mode to send the data. This reduces signaling overheads.

In a possible implementation, when the first communications device needs to send the data to the second communications device, a specific manner in which the first communications device determines whether to use the frequency-domain repetition mode to send the data include: determining, by the first communications device based on at least one of the following information: a measured value of a reference signal, and/or channel quality indicator CQI information, and/or modulation and coding scheme MCS information, whether to use the frequency-domain repetition mode to transmit the data.

In a possible implementation, the transmission mode instruction includes an indication identifier, the frequency-domain repetition mode includes at least two repetition manners, the indication identifier has a corresponding mapping relationship with the repetition manners, and the determining, by the first communications device, the frequency-domain repetition mode based on the transmission mode instruction may specifically include: determining, by the first communications device, the repetition manner in the frequency-domain repetition mode based on the indication identifier in the transmission mode and the mapping relationship, a repetition multiple (such as double repetition or quadruple repetition) and a continuous mapping status, such as continuous resource mapping or discontinuous resource mapping, of resource scheduling in each repeated data block. The repetition manner in the frequency-domain repetition mode may exist in a form of a resource mapping pattern of a repeated data block. In this embodiment of the present disclosure, the first communications device and the second communications device may specifically agree on the repetition manners in the frequency-domain repetition mode. The first communications device determines the repetition manner in the frequency-domain repetition mode based on the indication identifier in the transmission mode and the mapping relationship. The first communications device may determine the specific repetition manner based on a current channel status, to make demodulation performance optimal.

According to a second aspect, an embodiment of the present disclosure provides a computer storage medium, configured to store a computer software instruction used by the foregoing communications device. The computer software instruction includes a program designed for performing the foregoing aspect.

According to a third aspect, an embodiment of the present disclosure provides a communications device that has a function performed by the first communications device in the foregoing method. The function may be implemented by using hardware, or may be implemented by hardware executing corresponding software. The hardware or the software includes one or more modules corresponding to the foregoing function.

According to a fourth aspect, a structure of a communications device includes a memory, a transceiver, and a processor. The memory is configured to store computer executable program code, and is coupled to the transceiver. The program code includes an instruction, and when the processor executes the instruction, the instruction enables the communications device to execute information or an instruction in the foregoing method.

DESCRIPTION OF EMBODIMENTS

Embodiments of the present disclosure provide a data transmission method and a communications device, to enhance coverage, and in particular, to enhance coverage of a high frequency signal.

In the specification, claims, and accompanying drawings of the present disclosure, the terms "first", "second", "third", "fourth", and the like (if existent) are intended to distinguish between similar objects but do not necessarily indicate a specific order or sequence. It should be understood that the data used in such a way is interchangeable in proper circumstances so that the embodiments described herein can be implemented in other orders than the order illustrated or described herein. In addition, the terms "include", "have", and any other variants mean to cover the non-exclusive inclusion, for example, a process, method, system, product, or device that includes a list of steps or units is not necessarily limited to the expressly listed steps or units, but may include other steps or units not expressly listed or inherent to such a process, method, product, or device.

Figure 1:
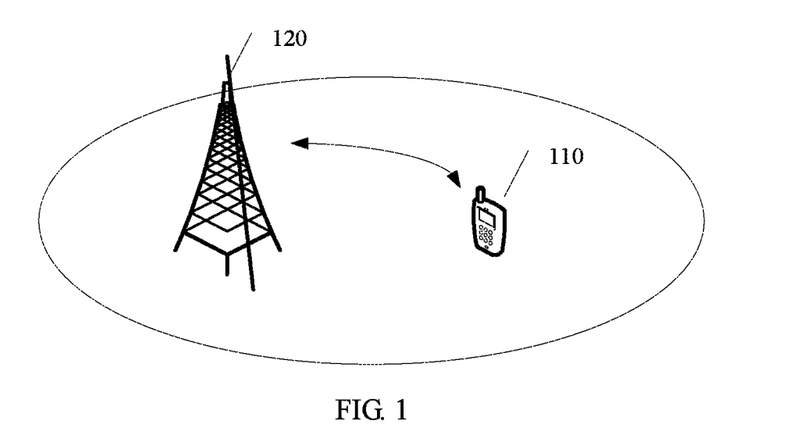
FIG. 1 is a schematic architectural diagram of a data transmission system according to an embodiment of the present disclosure.

An embodiment of the present disclosure provides a data transmission method. The method is applied to a data transmission system. FIG. 1 is a schematic architectural diagram of a data transmission system according to an embodiment of the present disclosure. The data transmission system includes a first communications device 110 and a second communications device 120. The first communications device 110 may be a macro base station, a base station to which a cell belongs or a transmission node to which a cell belongs, a micro base station, a small cell, a pico base station, a gNodeB in future 5G, or the like.

The second communications device 120 may be user equipment (UE), customer premises equipment (CPE for short) customer premises equipment, access user equipment, a subscriber unit, a subscriber station, a mobile station, a mobile console, a remote station, remote user equipment, a mobile device, a wireless communications device, a user agent, or a user apparatus. The access user equipment may be a cellular phone, a cordless phone, a session initiation protocol (SIP for short) phone, a personal digital assistant (PDA for short), a handheld device having a wireless communication function, a computing device or another processing device connected to a wireless modem, a vehicle-mounted device, a wearable device, user equipment in a future 5G network, or the like.

Alternatively, the first communications device 110 may be user equipment, customer premises equipment, or the like, and the second communications device 120 is a macro base station, a base station to which a cell belongs or a transmission node to which a cell belongs, a micro base station, a small cell, a pico base station, a gNodeB in future 5G or the like.

In the schematic architectural diagram shown in FIG. 1, an example in which the first communications device is user equipment and the second communications device is a base station is used for description. It should be noted that the schematic architectural diagram shown in FIG. 1 is only an example enumerated for this embodiment of the present disclosure for ease of description and does not constitute a limitation on the description of the present disclosure. In this embodiment of the present disclosure, a single high-frequency cell in a wireless communications system may be used as an example. An application scenario of the single high-frequency cell is used as an example for description in FIG. 1. The first communications device obtains a transmission mode instruction, where the first communications device may be a base station or user equipment, the transmission mode instruction is used to instruct the first communications device to use a frequency-domain repetition mode to transmit data, and the frequency-domain repetition mode means that same data is repeatedly transmitted on different frequency-domain resources. The first communications device determines the frequency-domain repetition mode based on the transmission mode instruction. The first communications device performs data transmission with the second communications device in the frequency-domain repetition mode. In this embodiment of the present disclosure, a same transport block is repeatedly transmitted in frequency domain, to directly improve demodulation performance and enhance coverage.

The method may be applied to sending of uplink data, and the uplink data is data sent by user equipment to a base station. The method may also be applied to sending of downlink data, and the downlink data is data sent by a base station to user equipment.

For ease of understanding, the words in the embodiments are briefly explained.

Figure 2:
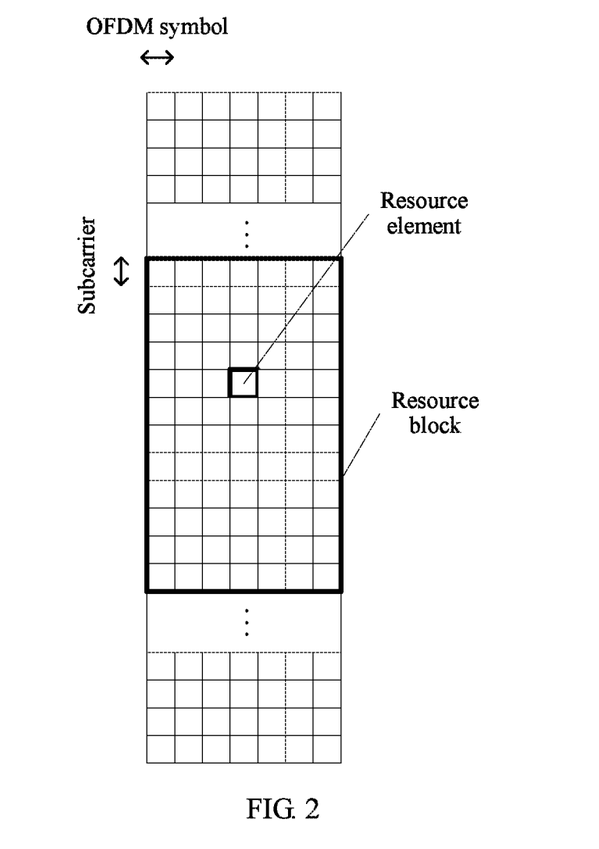
FIG. 2 is a schematic diagram of a resource grid according to an embodiment of the present disclosure.

With reference to FIG. 2 for understanding, FIG. 2 is a schematic diagram of a resource grid. A transmission signal is distributed and arranged in time domain and frequency domain in a form of a time-frequency resource grid, and a resource element (RE for short) is a basic composition element in the time-frequency resource grid and is a minimum resource unit used for uplink data transmission and downlink data transmission.

In a communications system, a unit for describing resource mapping is a resource block (RB for short), and one RB includes $N_{sc}^{RB} \times N_{symb}^{DL}$ resource elements. $N_{symb}^{DL}$ represents a quantity of orthogonal frequency division multiplexing (OFDM for short) symbols in each slot, and $N_{sc}^{RB}$ represents a quantity of subcarriers in each resource block.

A resource block group (RBG for short) is a basic unit of traffic channel resource allocation, and includes a group of RBs. A quantity of RBs included in the RBG is related to system bandwidth.

A frequency-domain repetition mode means that same data is repeatedly transmitted on different frequency-domain resources. For example, a same transport block (TB for short) is transmitted on different RBGs.

A sounding reference signal (SRS for short) is an uplink reference signal, is reported by UE to a base station, and is used by the base station to measure quality of an uplink channel, estimate frequency-domain information of the uplink channel, and perform frequency-domain selective scheduling.

A demodulation reference signal (DMRS for short) is used for related demodulation of an uplink control channel and an uplink data channel.

A reference signal received power (RSRP for short) is an average value of signal powers received on all REs of a reference signal carried in a symbol, and is a parameter that can represent strength of a radio signal in an UTE network.

A channel quality indicator (CQI for short) is used to reflect channel quality of a physical downlink shared channel (PDSCH for short). For example, 0 to 15 may be used to represent the channel quality of the PDSCH, where 0 represents poorest channel quality, and 15 represents best channel quality. User equipment sends a CQI to a base station on a physical uplink control channel (PUCCH for short) PUCCH or a physical uplink shared channel (PUSCH for short). The base station obtains CQI information and can determine current quality of a wireless channel.

Figure 3:
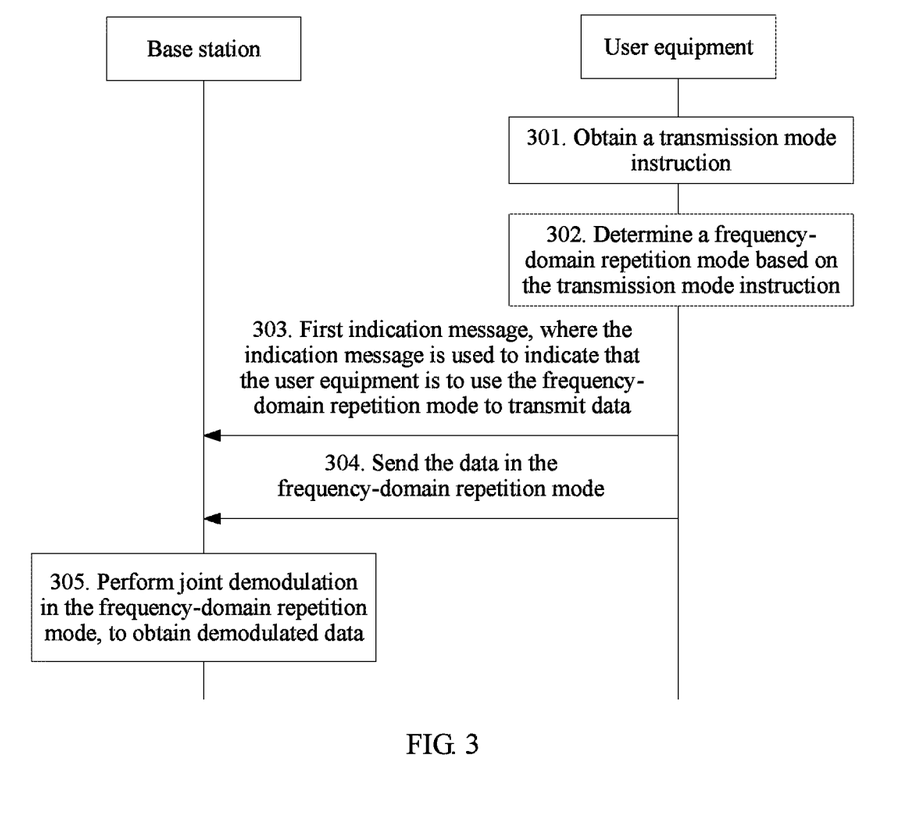
FIG. 3 is a schematic diagram of steps of an embodiment of a data transmission method according to an embodiment of the present disclosure.

Referring to FIG. 3, an embodiment of a data transmission method provided in an embodiment of the present disclosure includes the following steps.

In this embodiment, an example in which a first communications device is user equipment and a second communications device is a base station is used for description. In this embodiment, an application scenario of a single high-frequency cell is used as an example. The user equipment sends uplink data to the base station in the high-frequency cell in a frequency-domain repetition mode.

Step 301: The user equipment obtains a transmission mode instruction, where the transmission mode instruction is used to instruct the user equipment to use the frequency-domain repetition mode to send data, and the frequency-domain repetition mode means that same data is repeatedly sent on different frequency-domain resources.

There are two manners in which the user equipment obtains the transmission mode instruction: 1. receiving the transmission mode instruction sent by the base station; and 2. generating the transmission mode instruction by the user equipment.

In a first possible implementation, the transmission mode instruction is generated by the base station, and then the base station sends the transmission mode instruction to the user equipment. The base station sends the transmission mode instruction by using a physical downlink control channel (PDCCH for short) or semi-static signaling, and the transmission mode instruction is used to instruct the user equipment to use the frequency-domain repetition mode to send the data. A determining method used by the base station to determine to use the frequency-domain repetition mode includes at least one of the following manners.

1. Whether to instruct the user equipment to use the frequency-domain repetition mode to send the data is determined based on a measured value of a reference signal. For example, the base station may determine, based on a measured value such as an RSRP measured based on a sounding reference signal (SRS for short) or an uplink DMRS, whether to trigger the user equipment to use the frequency-domain repetition mode to send the data. For example, when the measured value such as the RSRP measured based on the uplink DMRS exceeds a preset range, it is determined that the user equipment needs to be triggered to use the frequency-domain repetition mode to send the data. It may be understood that when it can be determined, based on the measured value of the reference signal, that current channel quality is relatively poor, the transmission mode instruction is generated, and the transmission mode instruction is sent to the user equipment. The user equipment needs to be triggered to use the frequency-domain repetition mode to send the data, so as to enhance coverage.

2. Whether to instruct the user equipment to use the frequency-domain repetition mode to send the data is determined based on channel quality indicator CQI information. For example, if a value of a CQI is greater than a preset value, the base station generates the transmission mode instruction, and sends the transmission mode instruction to the user equipment, to trigger the user equipment to use the frequency-domain repetition mode to send the data.

3. Whether to instruct the user equipment to use the frequency-domain repetition mode to send the data is determined based on modulation and coding scheme (MCS for short) information. A modulation and coding scheme mainly implements configuration of a radio frequency rate. Because a physical rate depends on a plurality of factors such as a modulation method, a code rate, and a quantity of spatial flows, the MCS may be understood as a complete combination of these rate affecting factors. Each combination is uniquely identified by using an integer. Each MCS index actually corresponds to a physical transmission rate obtained based on a group of parameters.

The base station may determine, based on MCS information of an uplink PUSCH, whether to trigger the user equipment to use the frequency-domain repetition mode to send the data. For example, if the MCS information exceeds a preset range, it indicates that the physical transmission rate is relatively low, and the base station determines to trigger the user equipment to use the frequency-domain repetition mode to send the data.

It should be noted that the foregoing specific manners in which the base station determines whether to instruct the user equipment to use the frequency-domain repetition mode to send the uplink data are merely an example for description and do not constitute a limitation on the description of the present disclosure.

The base station dynamically sends the transmission mode instruction to the user equipment. To be specific, when detecting that the current channel quality is relatively poor, the base station may instruct the user equipment to use the frequency-domain repetition mode to send the data. This enhances real-time quality.

Alternatively, the base station sends the transmission mode instruction by using the semi-static signaling. To be specific, after sending the transmission mode instruction to the user equipment, the base station configures the user equipment. The base station may periodically instruct the user equipment to use the frequency-domain repetition mode to send the data. This reduces signaling overheads. In this embodiment of the present disclosure, a specific manner in which the base station sends the transmission mode instruction to the user equipment is not limited.

In a second possible implementation, the transmission mode instruction is generated by the user equipment. In other words, the user equipment may determine whether to use the frequency-domain repetition mode to send the data to the base station.

Specifically, a determining method used by the user equipment to determine whether to use the frequency-domain repetition mode includes at least one of the following manners.

1. Whether to trigger the user equipment to use the frequency-domain repetition mode to send the data is determined based on a measured value such as an RSRP measured based on a channel state information-reference signal (CSI-RS) or a downlink DMRS.

2. Whether to trigger the user equipment to use the frequency-domain repetition mode to send the data is determined based on information such as a CQI/RI fed back by the user equipment.

3. The user equipment may determine, based on MCS information of an uplink PUSCH, whether to trigger the user equipment to use the frequency-domain repetition mode to send the data.

In this manner, after the user equipment determines that the user equipment needs to use the frequency-domain repetition mode to send the data to the base station, the user equipment needs to dynamically or semi-statically send a message to the base station. The message is used to notify the base station that the user equipment prepares to use the frequency-domain repetition mode to send the data to the base station.

Step 302: The user equipment determines the frequency-domain repetition mode based on the transmission mode instruction.

The user equipment determines, based on the transmission mode instruction, that the user equipment needs to use the frequency-domain repetition mode to send the data to the base station.

Further, the transmission mode instruction includes an indication identifier, the frequency-domain repetition mode includes at least two repetition manners, and the indication identifier has a corresponding mapping relationship with the repetition manners. The user equipment determines the repetition manner in the frequency-domain repetition mode based on the indication identifier in the transmission mode and the mapping relationship.

Figure 4:
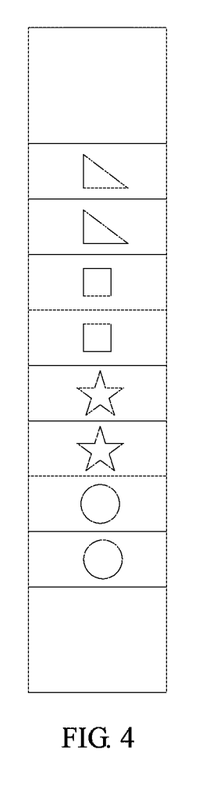
FIG. 4 is a schematic diagram of continuous resource mapping of frequency-domain repetition data blocks according to an embodiment of the present disclosure.
Figure 5:
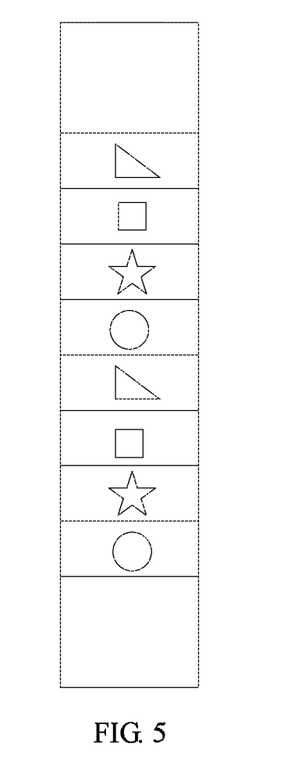
FIG. 5 is a schematic diagram of discontinuous resource mapping of frequency-domain repetition data blocks according to an embodiment of the present disclosure.

The repetition manner in the frequency-domain repetition mode may specifically include a repetition multiple (such as double repetition or quadruple repetition) and a continuous mapping status, such as continuous resource mapping or discontinuous resource mapping, of resource scheduling in each repeated data block. Referring to FIG. 4 and FIG. 5 for understanding, FIG. 4 is a schematic diagram of continuous resource mapping of frequency-domain repetition data blocks, and FIG. 5 is a schematic diagram of discontinuous resource mapping of frequency-domain repetition data blocks. In FIG. 4 and FIG. 5, cells in a sequence are different frequency-domain resources, and marks of different shapes are used to identify data blocks. In this embodiment, double repetition is used as an example for description. It can be learned from FIG. 4 that a same data block is repeatedly sent on different frequency-domain resources, but the same data block is continuously mapped on the frequency-domain resources. It can be learned from FIG. 5 that a same data block is repeatedly sent on different frequency-domain resources, but the same data block is not continuously mapped on the frequency-domain resources. It should be noted that, for example, the repetition manner in the frequency-domain repetition mode may exist in a form of a resource mapping pattern of a repeated data block.

In this embodiment of the present disclosure, for example, the indication identifier may include "1", "2", or "3". For example, "1" represents double repetition and a continuous mapping manner, and "2" represents quadruple repetition and a discontinuous mapping manner. For another example, the indication identifier may include two types: a first identifier used to represent a repetition multiple (such as "1" or "2") and a second identifier used to represent a mapping manner (such as "a" or "b"). Combinations of a value included in the first identifier and a value included in the second identifier jointly represent different repetition manners. Certainly, the repetition manner may be alternatively represented by using one type of identifier.

For example, if the indication identifier is "1", the indication identifier represents double repetition.

If the identifier includes "1" and "a", the identifier represents double repetition and continuous mapping, or the like.

It should be noted that the user equipment and the base station pre-agree, by using a protocol, on the frequency-domain repetition mode and the repetition manners included in the frequency-domain repetition mode. The foregoing indication identifier is only an example for ease of description and does not constitute a limitation on the description of the present disclosure.

In this embodiment of the present disclosure, the first communications device and the second communications device may specifically agree on the repetition manners in the frequency-domain repetition mode. The first communications device determines the repetition manner in the frequency-domain repetition mode based on the indication identifier in the transmission mode and the mapping relationship. The first communications device may determine the specific repetition manner based on a current channel status, to make demodulation performance optimal.

Step 303: The user equipment sends a first indication message to the base station, where the first indication message is used to indicate that the user equipment is to use the frequency-domain repetition mode to transmit the data.

Optionally, in an implementation, if the transmission mode instruction in step 301 is sent by the base station to the user equipment, the user equipment may directly perform step 304 without performing step 303.

Step 304: The user equipment sends the data to the base station in the frequency-domain repetition mode.

The user equipment sends the uplink data to the base station in the frequency-domain repetition mode.

Further, the user equipment may determine a specific repetition manner based on the indication identifier, to send the uplink data to the base station.

It should be noted that in a system in which a plurality of antennas perform transmission on a user equipment side, the user equipment may transmit data of different frequency-domain repetition blocks by weighting the data with different dynamic precoding or PMI codebooks, so as to better match channels on different frequency bands, thereby improving demodulation performance.

Step 305: The base station performs joint demodulation on the data in the frequency-domain repetition mode, to obtain demodulated data.

The base station extracts a plurality of repeated data blocks in the frequency-domain repetition mode or the specific repetition manner in the frequency-domain repetition mode for combined receiving, combines the repeated data blocks to perform joint multiple-input multiple-output (MIMO for short) equalization, and then performs demodulation, channel decoding, and the like, to perform joint demodulation on the data, so as to obtain the demodulated data.

In this embodiment of the present disclosure, the base station may instruct the user equipment to use the frequency-domain repetition mode to send the uplink data, or the user equipment may autonomously determine to use the frequency-domain repetition mode to send the uplink data. Then, the user equipment sends the data in the frequency-domain repetition mode, so that demodulation performance of a PUSCH channel can be improved, thereby increasing a coverage distance of a system. Specifically, 2 dB to 4 dB coverage enhancement can be achieved through transmission based on double repetition, and 5 dB to 8 dB coverage enhancement can be achieved through transmission based on quadruple repetition.

Figure 6:
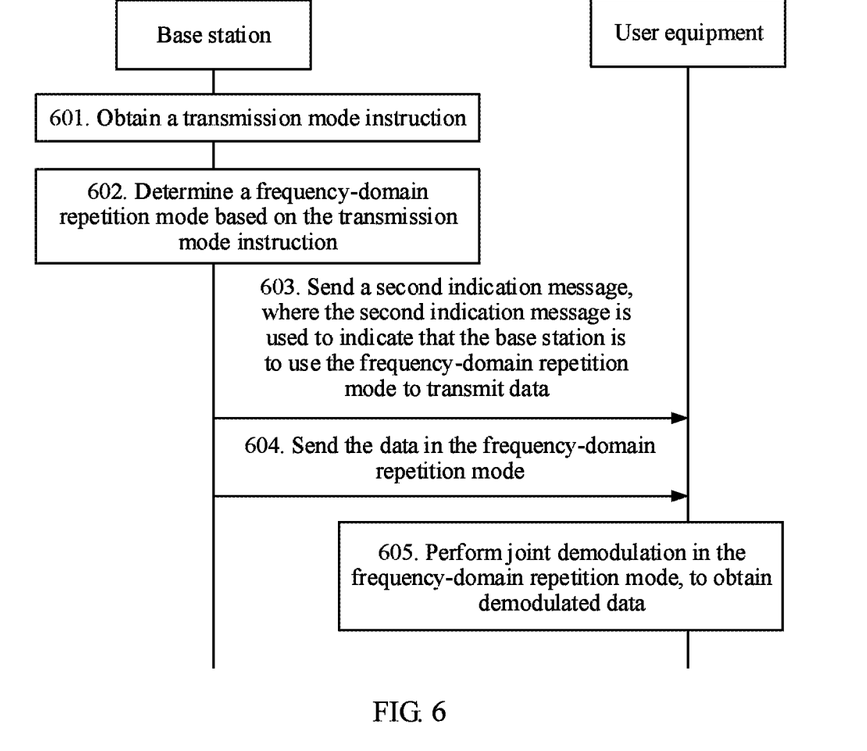
FIG. 6 is a schematic diagram of steps of another embodiment of a data transmission method according to an embodiment of the present disclosure.

The foregoing provides the description by using an example in which the first communications device is the user equipment, the second communications device is the base station, and the user equipment sends the uplink data to the base station. The following provides a description by using an example in which a first communications device is a base station, a second communications device is user equipment, and the base station sends downlink data to the user equipment. Referring to FIG. 6, another embodiment of a data transmission method provided in an embodiment of the present disclosure includes the following steps.

Step 601: The base station obtains a transmission mode instruction, where the transmission mode instruction is used to instruct the base station to use a frequency-domain repetition mode to transmit data, and the frequency-domain repetition mode means that same data is repeatedly transmitted on different frequency-domain resources.

There are two manners in which the base station obtains the transmission mode instruction: 1. generating the transmission mode instruction by the base station; and 2. receiving the transmission mode instruction sent by the user equipment.

In a first possible implementation, the transmission mode instruction is generated by the base station, and the base station is to use the frequency-domain repetition mode to send the downlink data to the user equipment. A determining method used by the base station to determine to use the frequency-domain repetition mode includes at least one of the following manners.

1. Whether to instruct the user equipment to use the frequency-domain repetition mode to send the data is determined based on a measured value of a reference signal.

2. Whether to instruct the user equipment to use the frequency-domain repetition mode to send the data is determined based on channel quality indicator CQI information.

3. Whether to instruct the user equipment to use the frequency-domain repetition mode to send the data is determined based on modulation and coding scheme (MCS for short) information.

The base station may determine, based on MCS information of a downlink PUSCH, whether to trigger the user equipment to use the frequency-domain repetition mode to send the data.

It should be noted that the foregoing specific manners in which the base station determines whether to instruct the user equipment to use the frequency-domain repetition mode to send uplink data are merely an example for description and do not constitute a limitation on the description of the present disclosure.

In a second possible implementation, the transmission mode instruction is sent by the user equipment. In other words, the user equipment may determine to instruct the base station to use the frequency-domain repetition mode to send the data to the user equipment.

Specifically, a determining method used by the user equipment to determine whether to use the frequency-domain repetition mode includes at least one of the following manners.

1. The user equipment determines, based on a measured value such as an RSRP measured based on a CSI-RS or a downlink DMRS, whether to trigger the base station to use the frequency-domain repetition mode to send the data.

2. The user equipment may determine, based on MCS information of a downlink PDSCH, whether to trigger the base station to use the frequency-domain repetition mode to send the data.

In this manner, when the user equipment determines that the base station needs to use the frequency-domain repetition mode to transmit the data, the user equipment then sends a message to the base station. The user equipment needs to dynamically or semi-statically send the message to the base station. The message is used to notify the base station that the base station needs to use the frequency-domain repetition mode to send the downlink data to the user equipment.

Step 602: The base station determines the frequency-domain repetition mode based on the transmission mode instruction.

The base station determines, based on the transmission mode instruction, that the base station needs to use the frequency-domain repetition mode to send the downlink data to the user equipment.

Further, the transmission mode instruction includes an indication identifier, the frequency-domain repetition mode includes at least two repetition manners, and the indication identifier has a corresponding mapping relationship with the repetition manners. The base station determines the repetition manner in the frequency-domain repetition mode based on the indication identifier in the transmission mode and the mapping relationship.

The repetition manner in the frequency-domain repetition mode may specifically include a repetition multiple (such as double repetition or quadruple repetition) and a continuous mapping status, such as continuous resource mapping or discontinuous resource mapping, of resource scheduling in each repeated data block. For the continuous resource mapping and the discontinuous resource mapping, refer to FIG. 4 and FIG. 5 for understanding.

Step 603: The base station sends a second indication message to the user equipment, where the second indication message is used to indicate that the base station is to use the frequency-domain repetition mode to transmit the data.

Optionally, in an implementation, if the transmission mode instruction in step 601 is sent by the user equipment to the base station, the base station may directly perform step 604 without performing step 603.

Step 604: The base station performs data transmission with the user equipment in the frequency-domain repetition mode.

The base station sends the downlink data to the user equipment in the frequency-domain repetition mode.

Further, the base station may determine a specific repetition manner based on the indication identifier, to send the downlink data to the user equipment.

It should be noted that in a system in which a plurality of antennas perform transmission on a base station side, the base station may transmit data of different frequency-domain repetition blocks by weighting the data with different dynamic precoding or PMI codebooks, so as to better match channels on different frequency bands, thereby improving demodulation performance.

Step 605: The user equipment performs joint demodulation on the data in the frequency-domain repetition mode, to obtain demodulated data sent by the base station.

The user equipment extracts a plurality of repeated data blocks in the frequency-domain repetition mode or the specific repetition manner in the frequency-domain repetition mode for combined receiving, combines the repeated resource blocks to perform joint multiple-input multiple-output (MIMO for short) equalization, and then performs demodulation, channel decoding, and the like, to perform joint demodulation on the data, so as to obtain the demodulated data sent by the base station.

In this embodiment of the present disclosure, the base station may autonomously determine to use the frequency-domain repetition mode to send the downlink data; or the base station may receive the transmission mode instruction sent by the user equipment, and the base station determines, based on the received transmission mode instruction, to use the frequency-domain repetition mode to send the downlink data. Then, the base station sends the data in the frequency-domain repetition mode, so that demodulation performance of a downlink channel can be improved, thereby increasing a coverage distance of a system.

Figure 7:
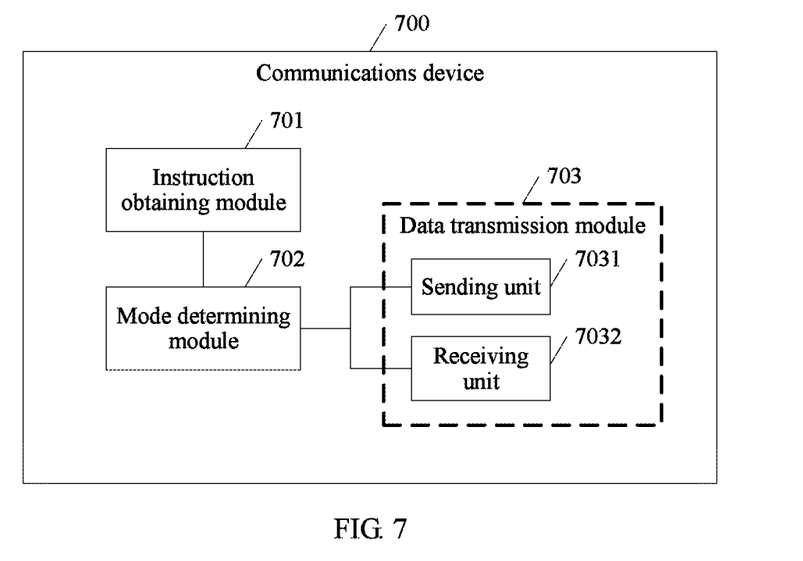
FIG. 7 is a schematic structural diagram of an embodiment of a communications device according to an embodiment of the present disclosure.

The foregoing describes the data transmission method provided in the embodiment of the present disclosure, and the following describes a communications device to which the data transmission method is applied. FIG. 7 shows an embodiment of a communications device 700 according to an embodiment of the present disclosure, and the communications device 700 includes:

an instruction obtaining module 701, configured to obtain a transmission mode instruction, where the transmission mode instruction is used to instruct to use a frequency-domain repetition mode to transmit data, and the frequency-domain repetition mode means that same data is repeatedly transmitted on different frequency-domain resources;

a mode determining module 702, configured to determine the frequency-domain repetition mode based on the transmission mode instruction obtained by the instruction obtaining module 701; and a data transmission module 703, configured to perform data transmission with a second communications device in the frequency-domain repetition mode determined by the mode determining module 702.

Further, the data transmission module 703 further includes a sending unit 7031 and a receiving unit 7032.

The sending unit 7031 is configured to send data to the second communications device in the frequency-domain repetition mode.

The receiving unit 7032 is configured to receive data sent by the second communications device in the frequency-domain repetition mode.

Optionally, the instruction obtaining module 701 is further configured to receive an indication instruction sent by the second communications device.

Figure 8:
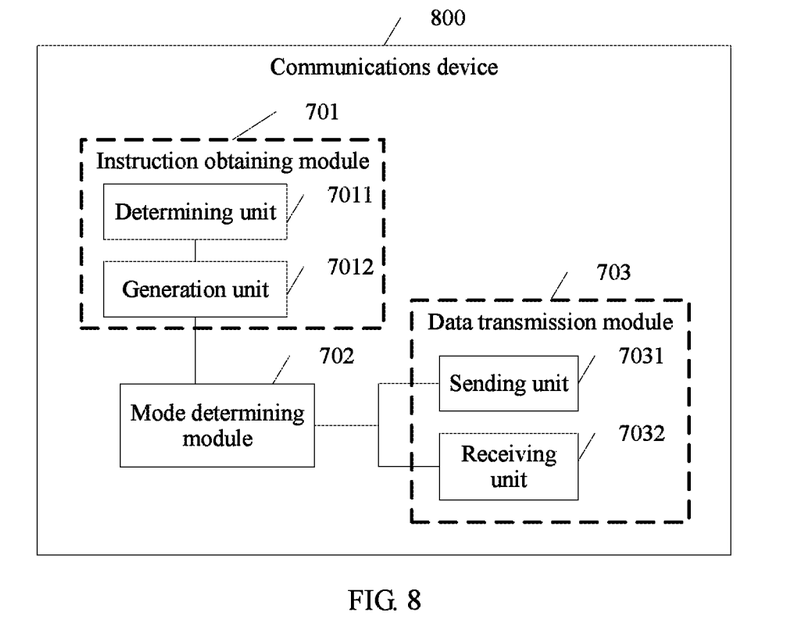
FIG. 8 is a schematic structural diagram of another embodiment of a communications device according to an embodiment of the present disclosure.

Based on the embodiment corresponding to FIG. 7, referring to FIG. 8, another embodiment of a communications device 800 provided in an embodiment of the present disclosure includes:

the instruction obtaining module 701 that includes a determining unit 7011 and a generation unit 7012.

The determining unit 7011 is configured to determine whether to use the frequency-domain repetition mode to send data.

The generation unit 7012 is configured to generate the transmission mode instruction when the determining unit 7011 determines to use the frequency-domain repetition mode to send the data.

Figure 9:
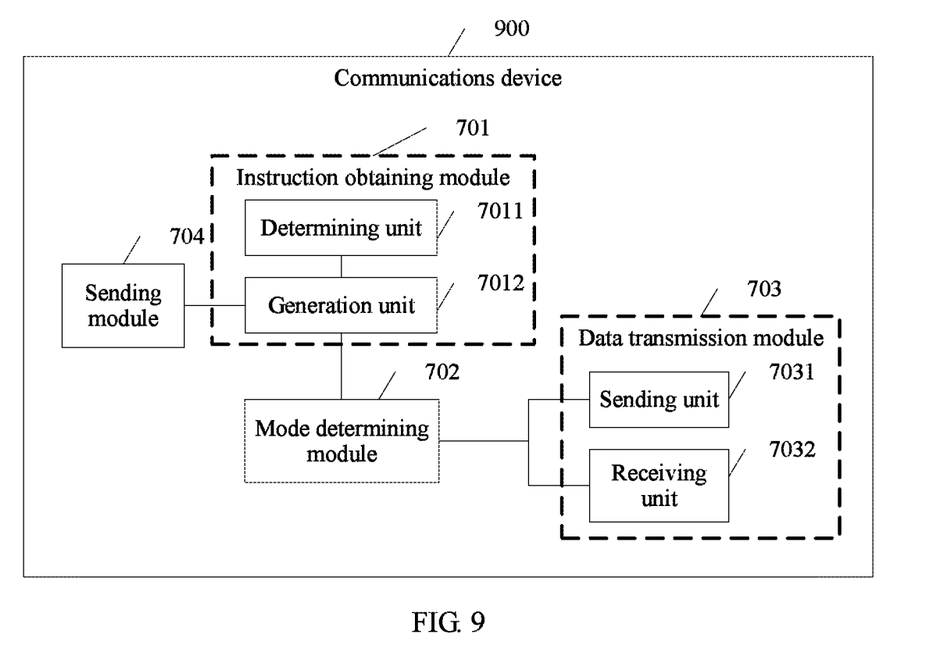
FIG. 9 is a schematic structural diagram of another embodiment of a communications device according to an embodiment of the present disclosure.

Based on the embodiment corresponding to FIG. 8, referring to FIG. 9, another embodiment of a communications device 900 provided in an embodiment of the present disclosure includes:

a sending module 704.

The sending module 704 sends the transmission mode instruction generated by the generation unit 7012 to the second communication, and the transmission mode instruction is used to instruct the second communications device to use the frequency-domain repetition mode to transmit data.

Optionally, the determining unit 7011 is further specifically configured to determine, based on at least one of the following information: a measured value of a reference signal, and/or channel quality indicator CQI information, and/or modulation and coding scheme MCS information, whether to use the frequency-domain repetition mode to transmit the data.

Optionally, the transmission mode instruction includes an indication identifier, the frequency-domain repetition mode includes at least two repetition manners, and the indication identifier has a corresponding mapping relationship with the repetition manners.

The mode determining module is further configured to determine the repetition manner in the frequency-domain repetition mode based on the indication identifier in the transmission mode and the mapping relationship. Further, the apparatuses in FIG. 7 to FIG. 9 are presented in a form of functional modules. The "module" herein may refer to an application-specific integrated circuit (ASIC), a circuit, a processor and a memory that execute one or more software or firmware programs, an integrated logic circuit, and/or another device that can provide the foregoing functions. In a simple embodiment, persons skilled in the art may figure out that the apparatuses in FIG. 7 to FIG. 9 may use a form shown in FIG. 10.

Figure 10:
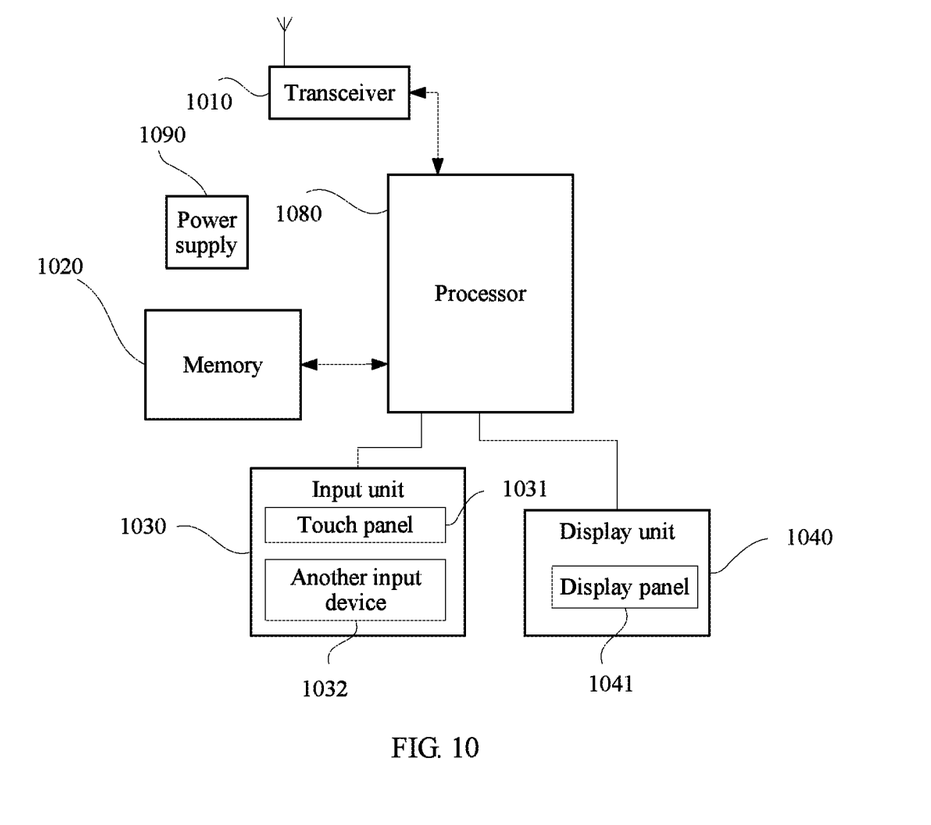
FIG. 10 is a schematic structural diagram of another embodiment of a communications device according to an embodiment of the present disclosure.

An embodiment of the present disclosure further provides another communications device. As shown in FIG. 10, for ease of description, only a part related to this embodiment of the present disclosure is shown. For specific technical details that are not disclosed, refer to the method part in the embodiments of the present disclosure. When the communications device is user equipment, the user equipment may include any terminal device such as a mobile phone, a tablet computer, a PDA (personal digital assistant), or a vehicle-mounted computer. An example in which the user equipment is a mobile phone is used.

FIG. 10 is a block diagram of a partial structure of a mobile phone related to a terminal provided in the embodiments of the present disclosure. Referring to FIG. 10, the mobile phone includes components such as a transceiver 1010, a memory 1020, an input unit 1030, a display unit 1040, a processor 1080, and a power supply 1090. Persons skilled in the art may understand that a structure of the mobile phone shown in FIG. 10 does not constitute a limitation on the mobile phone, and the mobile phone may include more or fewer components than those shown in the figure, may combine some components, or may have different component arrangements.

The following describes each component of the mobile phone in detail with reference to FIG. 10.

The transceiver 1010 may be configured to: receive a signal and send a signal in an information receiving/transmitting process or a call process; in particular, after receiving downlink information from a base station, send the downlink information to the processor 1080 for processing; and send related uplink data to the base station. Usually, the transceiver 1010 includes but is not limited to an antenna, at least one amplifier, a transceiver, a coupler, a low noise amplifier (LNA), a duplexes, or the like. In addition, the transceiver 1010 may further communicate with a network and another device through wireless communication. The wireless communication may be performed by using any communications standard or protocol, including but not limited to a global system for mobile communications (GSM), a general packet radio service (GPRS), code division multiple access (CDMA), wideband code division multiple access (WCDMA), long term evolution (LTE), an email, a short message service (SMS), or the like.

The memory 1020 may be configured to store a software program and a module. The processor 1080 performs various functional applications of the mobile phone and processes data by running the software program and the module stored in the memory 1020. The memory 1020 may mainly include a program storage area and a data storage area. The program storage area may store an operating system, an application program required by at least one function (such as a sound play function or an image play function), and the like. The data storage area may store data (such as audio data or a phone book) created based on use of the mobile phone, and the like. In addition, the memory 1020 may include a high-speed random access memory, or may include a non-volatile memory, for example, at least one magnetic disk storage device, a flash storage device, or another volatile solid-state storage device.

The input unit 1030 may be configured to: receive entered digital or character information, and generate key signal input related to user setting and function control of the mobile phone. Specifically, the input unit 1030 may include a touch panel 1031 and another input device 1032. The touch panel 1031, also referred to as a touchscreen, may collect a touch operation performed by a user on or near the touch panel (for example, an operation performed by the user on or near the touch panel 1031 by using any suitable object or accessory such as a finger or a stylus), and drive a corresponding connection apparatus according to a preset program. Optionally, the touch panel 1031 may include two parts: a touch detection apparatus and a touch controller. The touch detection apparatus detects a touch location of the user, detects a signal brought by a touch operation, and delivers the signal to the touch controller. The touch controller receives touch information from the touch detection apparatus, converts the touch information into touch point coordinates, and sends the touch point coordinates to the processor 1080. In addition, the touch controller can receive and execute a command sent by the processor 1080. In addition, the touch panel 1031 may be implemented by using a plurality of types such as a resistive type, a capacitive type, an infrared type, and a surface acoustic wave type. In addition to the touch panel 1031, the input unit 1030 may further include the another input device 1032. Specifically, the another input device 1032 may include but is not limited to one or more of a physical keyboard, a function key (such as a volume control key or an on/off key), a trackball, a mouse, and a joystick.

The display unit 1040 may be configured to display information entered by the user or information provided for the user, and various menus of the mobile phone. The display unit 1040 may include a display panel 1041. Optionally, the display panel 1041 may be configured in a form of a liquid crystal display (LCD), an organic light-emitting diode (OLED), or the like. Further, the touch panel 1031 may cover the display panel 1041. After detecting a touch operation on or near the touch panel 1031, the touch panel 1031 delivers the touch operation to the processor 1080, to determine a type of a touch event. Subsequently, the processor 1080 provides corresponding visual output on the display panel 1041 based on the type of the touch event. In FIG. 10, the touch panel 1031 and the display panel 1041 are used as two independent components to implement input and output functions of the mobile phone. However, in some embodiments, the touch panel 1031 and the display panel 1041 may be integrated to implement the input and output functions of the mobile phone.

The processor 1080 is a control center of the mobile phone, connects various parts of the entire mobile phone by using various interfaces and lines, and performs various functions of the mobile phone and processes data by running or executing the software program and/or the module stored in the memory 1020 and by invoking data stored in the memory 1020, to perform overall monitoring on the mobile phone. Optionally, the processor 1080 may include one or more processing units. Preferably, an application processor and a modern processor may be integrated into the processor 1080. The application processor mainly processes an operating system, a user interface, an application program, and the like. The modem processor mainly processes wireless communication. It may be understood that, alternatively, the modem processor may not be integrated into the processor 1080.

The mobile phone further includes the power supply 1090 (such as a battery) supplying power to each component. Preferably, the power supply may be logically connected to the processor 1080 by using a power management system, to implement functions such as charge and discharge management and power consumption management by using the power management system.

Although not shown, the mobile phone may further include a camera, a Bluetooth module, and the like. Details are not described herein.

In this embodiment the present disclosure, the processor 1080 and the transceiver 1010 further have the following functions.

The processor 1080 is configured to obtain a transmission mode instruction, where the transmission mode instruction is used to instruct the mobile phone cell phone to use a frequency-domain repetition mode to transmit data, and the frequency-domain repetition mode means that same data is repeatedly transmitted on different frequency-domain resources.

The processor 1080 is used by the cell phone to determine the frequency-domain repetition mode based on the transmission mode instruction.

The transceiver 1010 is configured to perform data transmission with the second communications device in the frequency-domain repetition mode.

Optionally, the transceiver 1010 is further configured to: send data to the second communications device in the frequency-domain repetition mode, or receive data sent by the second communications device in the frequency-domain repetition mode.

Optionally, the transceiver 1010 is configured to receive the indication instruction sent by the second communications device.

Optionally, the processor 1080 is configured to: determine whether to use the frequency-domain repetition mode to send data, and generate the transmission mode instruction if the processor 1080 determines to use the frequency-domain repetition mode to send the data.

The transceiver 1010 is further configured to send the transmission mode instruction to the second communication, and the transmission mode instruction is used to instruct the second communications device to use the frequency-domain repetition mode to transmit data.

Optionally, the processor 1080 is further used by the cell phone to determine, based on at least one of the following information: a measured value of a reference signal, and/or channel quality indicator CQI information, and/or modulation and coding scheme MCS information, whether to trigger the cell phone to use the frequency-domain repetition mode to transmit the data.

Optionally, the transmission mode instruction includes an indication identifier, the frequency-domain repetition mode includes at least two repetition manners, and the indication identifier has a corresponding mapping relationship with the repetition manners.

The processor 1080 is further configured to determine the repetition manner in the frequency-domain repetition mode based on the indication identifier in the transmission mode and the mapping relationship.

Figure 11:
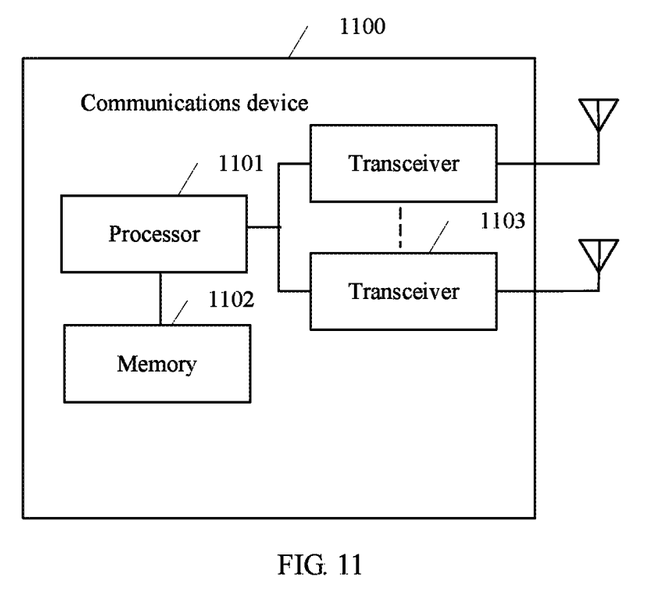
FIG. 11 is a schematic structural diagram of another embodiment of a communications device according to an embodiment of the present disclosure.

An embodiment of the present disclosure further provides another communications device. A base station may be used as an example of the communications device. Referring to FIG. 11, the communications device includes a processor 1101, a memory 1102, and a transceiver 1103.

FIG. 11 is a schematic structural diagram of a base station according to an embodiment of the present disclosure. There may be a relatively large difference in the base station 1100 due to different configurations or performance, and the base station 1100 may include one or more processors (central) 1101 and the memory 1102. The memory 1102 may perform temporary storage or persistent storage. A program stored in the memory 1102 may include one or more modules (not shown in the figure), and each module may include a series of instruction operations for the base station.

The processor 1101 is configured to enable the base station to perform the method in the foregoing method embodiments.

According to still another aspect of this application, a computer readable storage medium is provided. The computer readable storage medium stores an instruction. When the instruction runs on a computer, the computer is enabled to perform the method in the foregoing method embodiments.

According to still another aspect of this application, a computer program product including an instruction is provided. When the computer program product runs on a computer, the computer is enabled to perform the method in the foregoing method embodiments.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A data transmission method, comprising:
   obtaining, by a first communications device, a transmission mode instruction, wherein the transmission mode instruction instructs to use a frequency-domain repetition mode to transmit data, and in the frequency-domain repetition mode, same data is repeatedly transmitted on different frequency-domain resources, wherein the transmission mode instruction of using the frequency-domain repetition mode is determined based on at least one of a measured value of a reference signal, channel quality indicator (CQI) information, or modulation and coding scheme (MCS) information;
   determining, by the first communications device, the frequency-domain repetition mode based on the transmission mode instruction; and
   performing, by the first communications device, data transmission with a second communications device according to the frequency-domain repetition mode.

2. The data transmission method according to claim 1, wherein the performing, by the first communications device, data transmission with the second communications device according to the frequency-domain repetition mode comprises:
   sending, by the first communications device, data to the second communications device according to the frequency-domain repetition mode; or
   receiving, by the first communications device, data sent by the second communications device according to the frequency-domain repetition mode.

3. The data transmission method according to claim 1, wherein the obtaining, by a first communications device, a transmission mode instruction comprises:
   receiving, by the first communications device, the transmission mode instruction sent by the second communications device.

4. The data transmission method according to claim 1, wherein the obtaining, by a first communications device, a transmission mode instruction comprises:
   determining, by the first communications device, whether to use the frequency-domain repetition mode to send data; and
   generating the transmission mode instruction when the first communications device determines to use the frequency-domain repetition mode to send the data.

5. The data transmission method according to claim 4, wherein after the generating the transmission mode instruction, the method further comprises:
   sending, by the first communications device, the transmission mode instruction to the second communications device, wherein the transmission mode instruction instructs the second communications device to use the frequency-domain repetition mode to transmit data.

6. The data transmission method according to claim 4, wherein after the generating the transmission mode instruction, the method further comprises:
   sending, by the first communications device, the transmission mode instruction to the second communications device, wherein the transmission mode instruction indicates that the first communications device uses the frequency-domain repetition mode to send the data.

7. The data transmission method according to claim 4, wherein the transmission mode instruction comprises an indication identifier, the frequency-domain repetition mode comprises at least two repetition manners, the indication identifier has a corresponding mapping relationship with one of the at least two repetition manners, and the determining, by the first communications device, the frequency-domain repetition mode based on the transmission mode instruction comprises:
   determining, by the first communications device, a repetition manner in the frequency-domain repetition mode based on the indication identifier in the transmission mode instruction and the mapping relationship.

8. A communications device, comprising:
a processor; and
a non-transitory computer-readable storage medium coupled to the processor and storing programming instructions for execution by the processor, the programming instructions instruct the processor to:
obtain a transmission mode instruction, wherein the transmission mode instruction instructs to use a frequency-domain repetition mode to transmit data, and in the frequency-domain repetition mode, same data is repeatedly transmitted on different frequency-domain resources, wherein the transmission mode instruction of using the frequency-domain repetition mode is determined based on at least one of a measured value of a reference signal, channel quality indicator (CQI) information, or modulation and coding scheme (MCS) information;
determine the frequency-domain repetition mode based on the transmission mode instruction; and
perform data transmission with a second communications device according to the frequency-domain repetition mode.

9. The communications device according to claim 8, wherein the programming instructions instruct the processor to:
send data to the second communications device according to the frequency-domain repetition mode; or
receive data sent by the second communications device according to the frequency-domain repetition mode.

10. The communications device according to claim 8, wherein the programming instructions instruct the processor to:
receive the transmission mode instruction sent by the second communications device.

11. The communications device according to claim 8, wherein the programming instructions instruct the processor to:
determine whether to use the frequency-domain repetition mode to send data; and
generate the transmission mode instruction when the processor determines to use the frequency-domain repetition mode to send the data.

12. The communications device according to claim 11, wherein the programming instructions instruct the processor to:
send the transmission mode instruction to the second communications device, and the transmission mode instruction instructs the second communications device to use the frequency-domain repetition mode to transmit data.

13. The communications device according to claim 11, wherein the programming instructions instruct the processor to: send the transmission mode instruction to the second communications device, and the transmission mode instruction indicates that the communications device uses the frequency-domain repetition mode to send the data.

14. The communications device according to claim 11, wherein the transmission mode instruction comprises an indication identifier, the frequency-domain repetition mode comprises at least two repetition manners, and the indication identifier has a corresponding mapping relationship with one of the at least two repetition manners; and the programming instructions instruct the processor to:
determine a repetition manner in the frequency-domain repetition mode based on the indication identifier in the transmission mode instruction and the mapping relationship.

* * * * *